Dec. 18, 1928.  
J. RANTASA  
1,696,125  
PROPELLING ARRANGEMENT ON SLEIGHS  
Filed Aug. 24, 1925
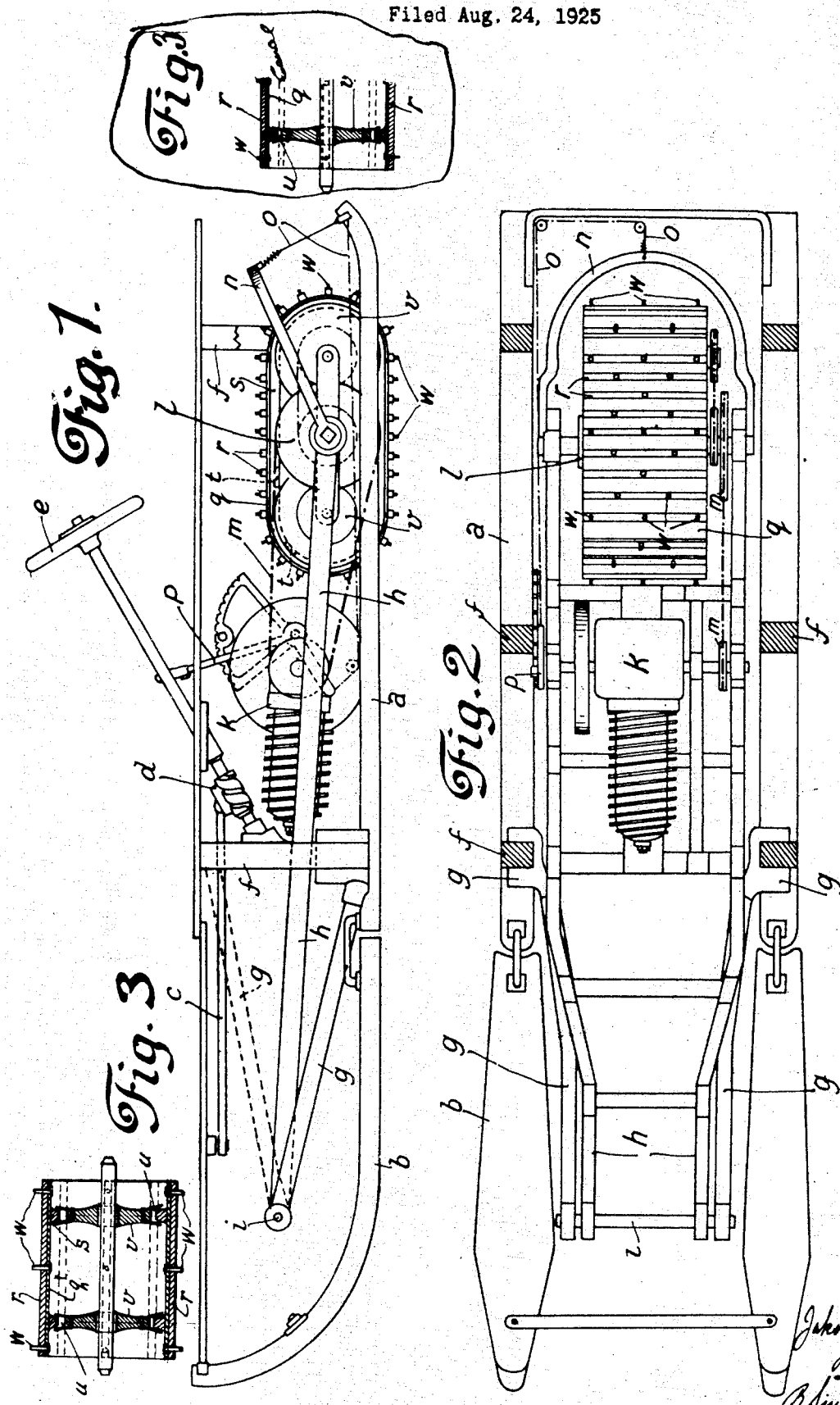
Inventor  
Jakob Rantasa  
By  
B. Singer, Atty.

Patented Dec. 18, 1928.

1,696,125

UNITED STATES PATENT OFFICE.

JAKOB RANTASA, OF VIENNA, AUSTRIA.

PROPELLING ARRANGEMENT ON SLEIGHS.

Application filed August 24, 1925, Serial No. 52,095, and in Austria September 13, 1924.

This invention relates to improvements in propelling or driving arrangements on sleighs or sledges, the object being to provide little sleighs or toboggans, bob-sleighs or the like with driving means in a simple and inexpensive but effectual manner so that it is possible to use these vehicles also for the up-hill course.

The invention consists of a unit rods-arrangement, bearing on its back part the motor and the propelling devices and being swingingly pivoted to the frame, so the propelling device can loosely lay on the snow, ice or the like in course.

Further the pivoting of the rods-arrangement takes place on the front ends of arms fastened on the frame of the sleigh and stretching far in front of the frame, by which the driving action is effective as tractive power. Hereby the working point of the driving device on the rods-arrangement is placed lower than that of the rods-arrangement on the arms of the frame, the front part of the sleigh being so maintained out of the snow or the like, by which the resistance in course is reduced.

The traction chain of the traction unit, forming the driving or propelling device of the sleigh, consists of a ribbon or band of india-rubber provided on the inner side with wedge like projections, with which the tractor band enters in wedge like grooves of the driven traction wheels, so being set in motion for propelling the sleigh or sled.

In the accompanying drawing:

Fig. 1 is an elevation of a bob-sleigh provided with the propelling arrangement according to this invention.

Fig. 2 is a plan of the same.

Fig. 3 is a detail sectional view of the endless traction band and the traction wheels.

In the drawing indicates: $b$ the steering runners of the sleigh, $a$ the sledge runners, $c, d$ the steering parts connecting the governing wheel $e$ with the steering runners $b$, further $g$ the arms fixed on the frame $f$ and on the sledge runners $a$, directed obliquely up—and forward and eventually supported by an upper arm, $h$ the rods-arrangement pivoted in $i$ on the front end of the arms $g$ and bearing: first the motor $k$, then the transmitting parts $m$ and on the rear end the traction unit $l$, forming the propelling device and being provided with means $n, o, p$ for pressing down the traction unit.

The endless traction band $q$ of india-rubber, forming the traction chain, is provided on the outer surface with paddle-like cross-ledge $r$, which may be made of one piece with the traction band $q$ preferably of gummi-cord and which are provided with radial projecting teeth or thorns $w$, which are designed to engage the ice or glaciated snow for propelling the sleigh. On the inner side of the traction band, wedge-like projections $s$ extend around the whole surface and enters into like-shaped grooves $u$ provided around the traction wheels $v$, whereby the band $q$ is carried away owing to the friction and adhesion between the surfaces of the projections $s$ and the grooves $u$ by the driven traction wheels $v$.

The projections $s$ and the grooves $u$ may be intermitted by steps $t$ or the like for securing the motion unit.

Having thus described the invention, what is claimed as new is:

1. A sleigh having its runners provided with forwardly and upwardly extending arms, a frame arranged between the runners and pivotally mounted at its front end between the front ends of said arms, a motor on said frames, and a traction unit mounted at the rear end of said frame and comprising traction wheels having wedge-shaped peripheral grooves, and an endless traction band connecting said wheels, said band being provided on its inner side with such wedge-shaped projections arranged to enter said grooves.

2. A sleigh having its runners provided with forwardly extending arms, a frame arranged between the runners and pivotally mounted at its front end between the front ends of said arms, a motor on said frame, a tractor unit mounted at the rear end of said frame and driven by said motor, a yoke mounted on the rear end of said frame and extending rearwardly and upwardly therefrom, a lever mounted on the sleigh, a cord connecting said lever and said yoke, and traction pulleys engaged by said cord, said cord and lever being arranged to draw downwardly on said yoke and to thereby depress the rear end of the frame and said tractor unit.

3. In combination with a sleigh a frame arranged between the sleigh runners and pivotally connected at its front end to the front portion of the sleigh for vertical movement of said frame, a traction unit mounted on said frame and a motor also mounted on said frame, said motor being connected to and arranged to operate said traction unit.

4. In combination with a sleigh a frame arranged between the sleigh runners and pivotally connected at its front end to the front portion of the sleigh for vertical movement of said frame, a traction unit pivotally mounted in the rear portion of said frame and a motor also mounted on said frame, said motor being connected to and arranged to operate said traction unit.

5. A sleigh having its runners provided with forwardly extending arms, a frame arranged between the runners and pivotally mounted at its front end between the front ends of said arms, a motor on said frame, and a tractor unit mounted also on said frame and driven by said motor.

In witness whereof I affix my signature.

JAKOB RANTASA.